United States Patent
Hsu

(10) Patent No.: US 7,384,020 B2
(45) Date of Patent: Jun. 10, 2008

(54) SUPPORTING FRAME STRUCTURE

(75) Inventor: Cheng-Chien Hsu, Hsi Chih (TW)

(73) Assignee: Amtek System Co., Ltd., Taipei Hsien (TW)

( * ) Notice: Subject to any disclaimer, the term of this patent is extended or adjusted under 35 U.S.C. 154(b) by 0 days.

(21) Appl. No.: 11/477,358

(22) Filed: Jun. 30, 2006

(65) Prior Publication Data
US 2008/0001044 A1    Jan. 3, 2008

(51) Int. Cl.
A47G 23/02    (2006.01)
(52) U.S. Cl. .................. 248/146; 248/454; 248/919
(58) Field of Classification Search ............... 248/146, 248/158, 454, 455, 457, 458, 917, 919, 922; 361/683
See application file for complete search history.

(56) References Cited

U.S. PATENT DOCUMENTS

| | | | | |
|---|---|---|---|---|
| 5,915,661 A | * | 6/1999 | Silverman et al. | 248/465.1 |
| 2005/0121594 A1 | * | 6/2005 | Kuo | 248/676 |
| 2006/0243879 A1 | * | 11/2006 | Chiu | 248/454 |
| 2007/0007423 A1 | * | 1/2007 | Wang | 248/454 |
| 2007/0075208 A1 | * | 4/2007 | Chen | 248/455 |

FOREIGN PATENT DOCUMENTS

| | | |
|---|---|---|
| TW | M262639 | 4/2004 |
| TW | M246678 | 10/2004 |
| TW | M249084 | 11/2004 |

* cited by examiner

Primary Examiner—Ramon O Ramirez
(74) Attorney, Agent, or Firm—Rosenberg, Klein & Lee

(57) ABSTRACT

A supporting frame for supporting a portable computer includes two supporting parts, a front linking rod, a rear linking rod, and a rotating element. The supporting parts are individually installed at two ends of the front linking rod and the rear linking rod and are connected with the front linking rod and the rear linking rod. The rotating element is rotatably wedged and fastened to the rear linking rod. The user can place a portable computer on the supporting surface formed by the supporting parts. It is convenient for the user to type. Alternatively, the user can put the portable computer in an upright position. The user can adjust the angle of the rotating element to change the angle of the portable computer to meet the user's requirements.

9 Claims, 6 Drawing Sheets

SUPPORTING FRAME STRUCTURE

BACKGROUND OF THE INVENTION

1. Field of the Invention

The present invention relates to a supporting frame structure. In particular, this invention relates to a supporting frame structure that is used to support a portable computer.

2. Description of the Related Art

As portable computers have become popular, many manufacturers have developed peripheral devices for them. A supporting frame that supports the portable computer on a desk is the most popular of these peripheral devices.

There are two kinds of supporting frames for a portable computer of the prior art—a built-in type and an external type. The built-in supporting frame is usually installed between the display screen and the keyboard of the portable computer. This built-in supporting frame merely provides horizontal and vertical operating statuses for the display screen. An external supporting frame, such as the supporting frames disclosed in T.W. M246678, M249084, and M262639, usually has a complicated structure. In order to be fastened steadily to a portable computer, the supporting frame is locked with the portable computer. Although the supporting frame is fastened steadily to the portable computer, it still causes some problems for the user.

SUMMARY OF THE INVENTION

One particular aspect of the present invention is to provide a supporting frame. The present invention adopts fewer elements to assemble the supporting frame for supporting a portable computer.

The supporting frame includes two supporting parts, a front linking rod, a rear linking rod, and a rotating element. The supporting parts are connected with two sides of the front linking rod and the rear linking rod. At the two ends of the rotating element, there are a wedging-fastening part and a pushing-leaning part. The wedging-fastening part is wedged and fastened to the rear linking rod and uses the rear linking rod as a shaft to rotate. When the supporting frame is not being used, the pushing-leaning part leans against the front linking rod. When the supporting frame is being used, the portable computer is placed on the inclined surface of the supporting parts and uses the hook to fasten the portable computer so as to prevent the portable computer from dropping. When the user wants to change the angle of the portable computer, the user changes the angle by adjusting the rotating element.

For further understanding of the invention, reference is made to the following detailed description illustrating the embodiments and examples of the invention. The description is only for illustrating the invention and is not intended to be considered limiting of the scope of the claim.

BRIEF DESCRIPTION OF THE DRAWINGS

The drawings included herein provide a further understanding of the invention. A brief introduction of the drawings is as follows.

DETAILED DESCRIPTION OF THE PREFERRED EMBODIMENTS

Figure 1:
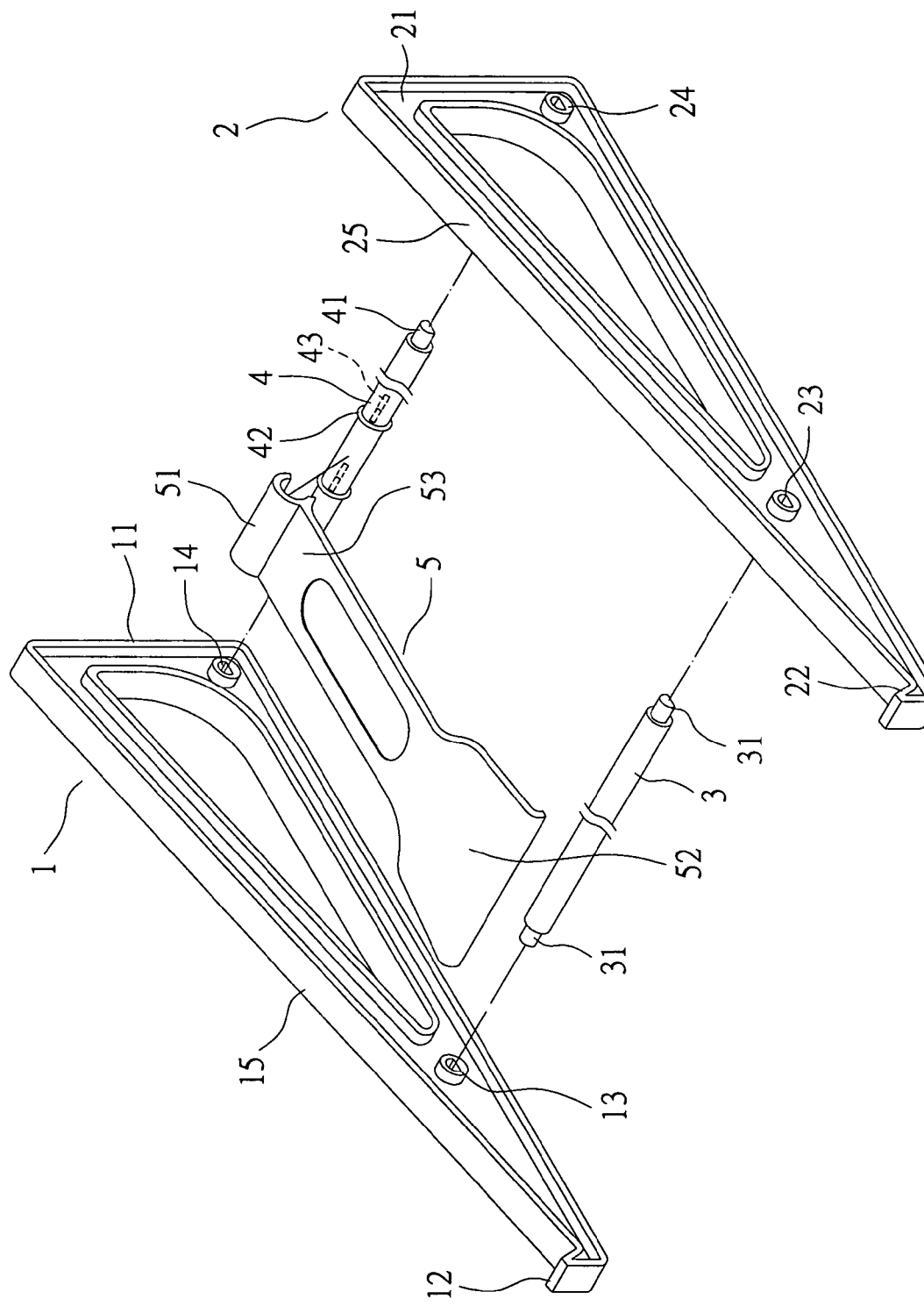
FIG. 1 is an exploded perspective view of the first embodiment of the present invention.

Reference is made to FIG. 1. The supporting frame includes a first supporting part 1, a second supporting part 2, a front linking rod 3, a rear linking rod 4, and a rotating element 5. The first supporting part 1 and the second supporting part 2 are individually connected with the front linking rod 3 and the rear linking rod 4. The shape of the bodies 11 and 21 of the first supporting part 1 and the second supporting part 2 is a right triangle shape. At the top end of one of the two acute angles whose angle is less than or equal to 45 degrees, there are positioning parts 12 and 22. The positioning part is a hook. At the back side of the positioning parts 12 and 22 of the acute angle, there are front linking holes 13 and 23. At the right angles of the supporting parts 1 and 2, there are rear linking holes 14 and 24. The front linking holes 13 and 23 and the rear linking holes 14 and 24 has a circular-hole shape in cross-sectional view. There are linking elements 31 and 41 located at the two ends of the front linking rod 3 and the rear linking rod 4. The linking elements 31 and 41 are column-shaped and fit in the front linking holes 13 and 23 and the rear linking holes 14 and 24. The two linking elements 31 of the front linking rod 3 are individually plugged into the front linking hole 13 of the first supporting part 1 and the front linking hole 23 of the second supporting part 2. The two linking elements 41 of the rear linking rod 4 are individually plugged into the rear liking hole 14 of the first supporting part 1 and the rear linking hole 24 of the second supporting part 2. Due to the outline of the front linking holes 13 and 23, the rear linking holes 14 and 24, and the linking elements 31 and 41, the front linking rod 3 and the rear linking rod 4 are steadily connected with the first supporting part 1, the second supporting part 2. As such, the rear linking rod 4 cannot be rotated. Furthermore, two leveling elements 42 are located on the upward surface of the rear linking rod 4. The two leveling elements 42 are located at the right side and the left side of the rear linking rod 4 and are symmetrical to each other. Another two positioning elements 43 are located at the downward surface of the rear linking rod 4 that is located between the leveling elements 42. At the two ends of the rod 53 of the rotating element 5, there is a wedging-fastening part 51 and a pushing-leaning part 52. The wedging-fastening part 51 is wedged and fastened to the rear linking rod 4 and is located between the leveling elements 42. The distance between the leveling elements 42 is larger than the width of the wedging-fastening part 51 so as to make the rotating element 5 be disposed at the middle location of the rear linking rod 4. The user uses the rear linking rod 4 as a shaft to rotate the rotating element 5. The positioning element 43 of the rear linking rod 4 restricts the rotation angle of the rotating element 5. When the rotating element 5 is not being used, the pushing-leaning part 52 leans against the front linking rod 3. The first supporting part 1 and the second supporting part 2 are connected together via the front linking rod 3 and the rear linking rod 4, and the hypotenuse of the two right triangles forms supporting surfaces 15 and 25 to support the portable computer. The positioning parts 12 and 22 are used for blocking the portable computer so as to prevent the portable computer from dropping. When the user wants to change the angle of the portable computer, the user adjusts the angle of the rotating element 5.

Figure 2:
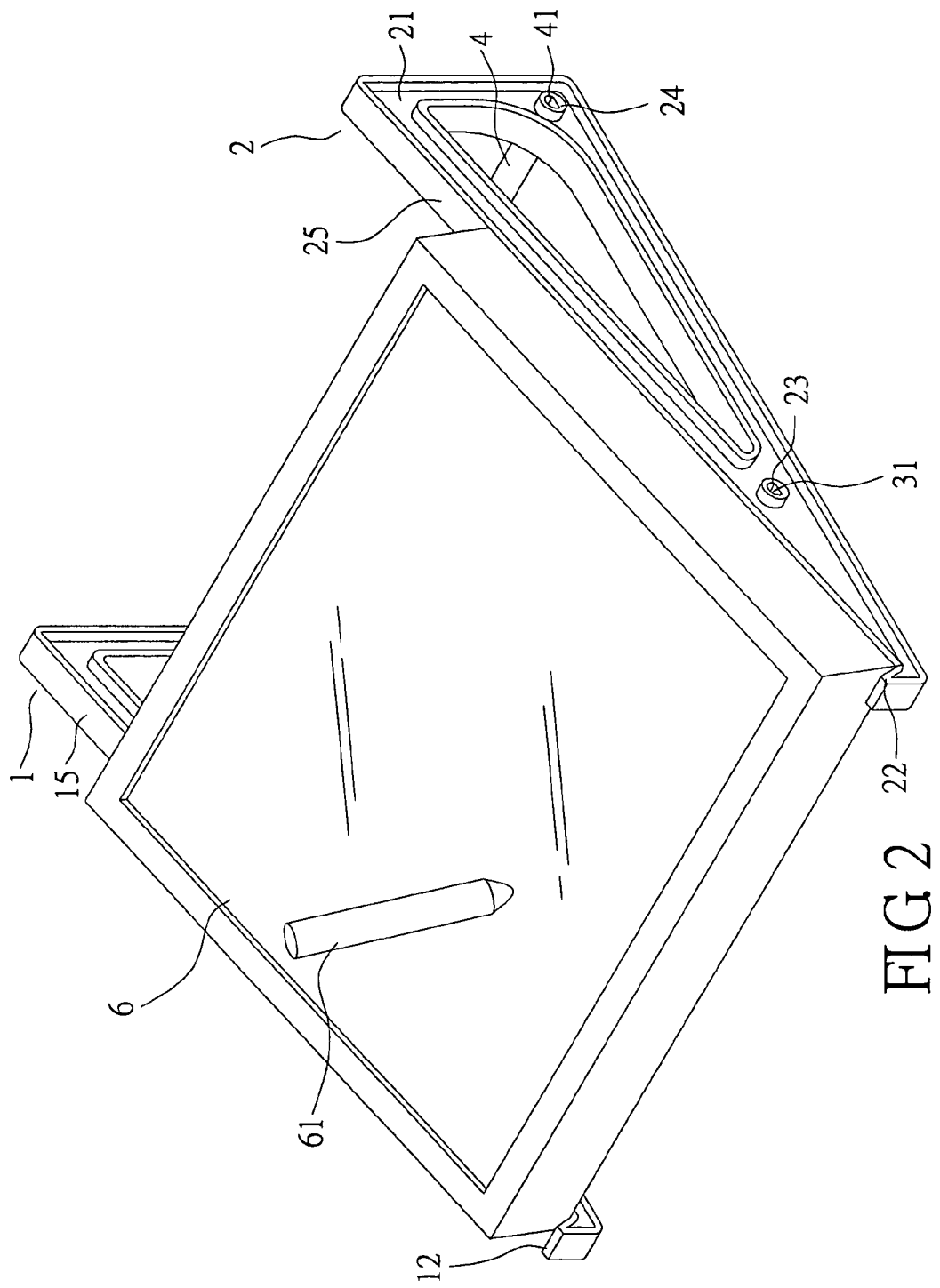
FIG. 2 is a schematic diagram of the first usage status of the present invention.
Figure 3:
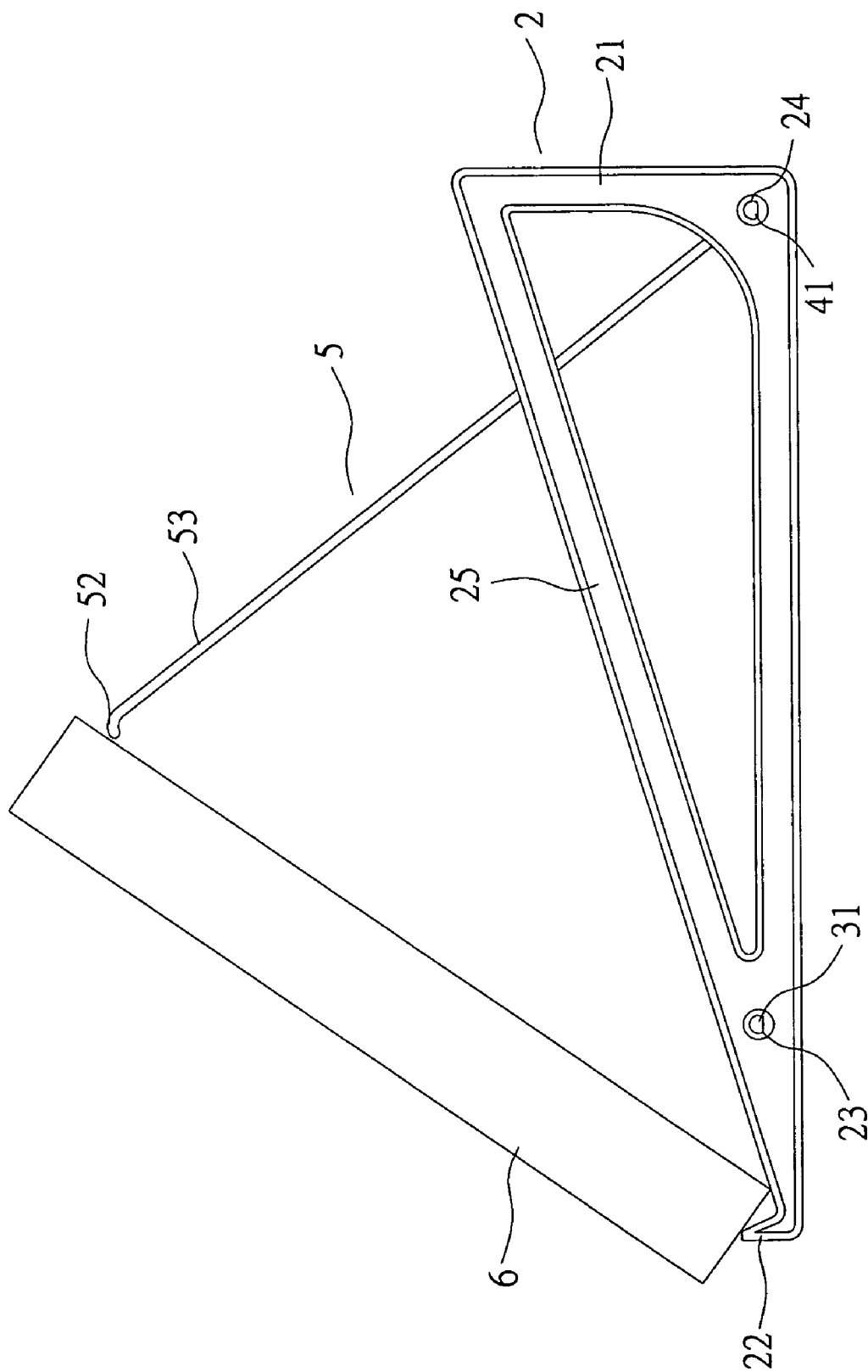
FIG. 3 is a schematic diagram of the second usage status of the present invention.

Reference is made to FIGS. 2 and 3. The user places the portable computer 6 on the supporting surfaces 15 and 25 of the first supporting part 1 and the second supporting part 2 (as shown in FIG. 2). The angle of the portable computer 6 is suitable for the user to type. Thereby, the user uses a touching-control pen 61 to perform an input operation on the portable computer 6. When the user wants to use the portable computer 6 to watch movies or view data, the rotating element 5 is rotated to the maximum angle (as shown in FIG. 3). The pushing-leaning part 52 pushes the portable computer 6 to make the portable computer vertical. It is convenient for the user to watch movies or view data by using the portable computer 6. Furthermore, the user can change the angle of the rotating element 5 according to their personal requirements or the visible angle of the screen of the portable computer 6.

Figure 4:
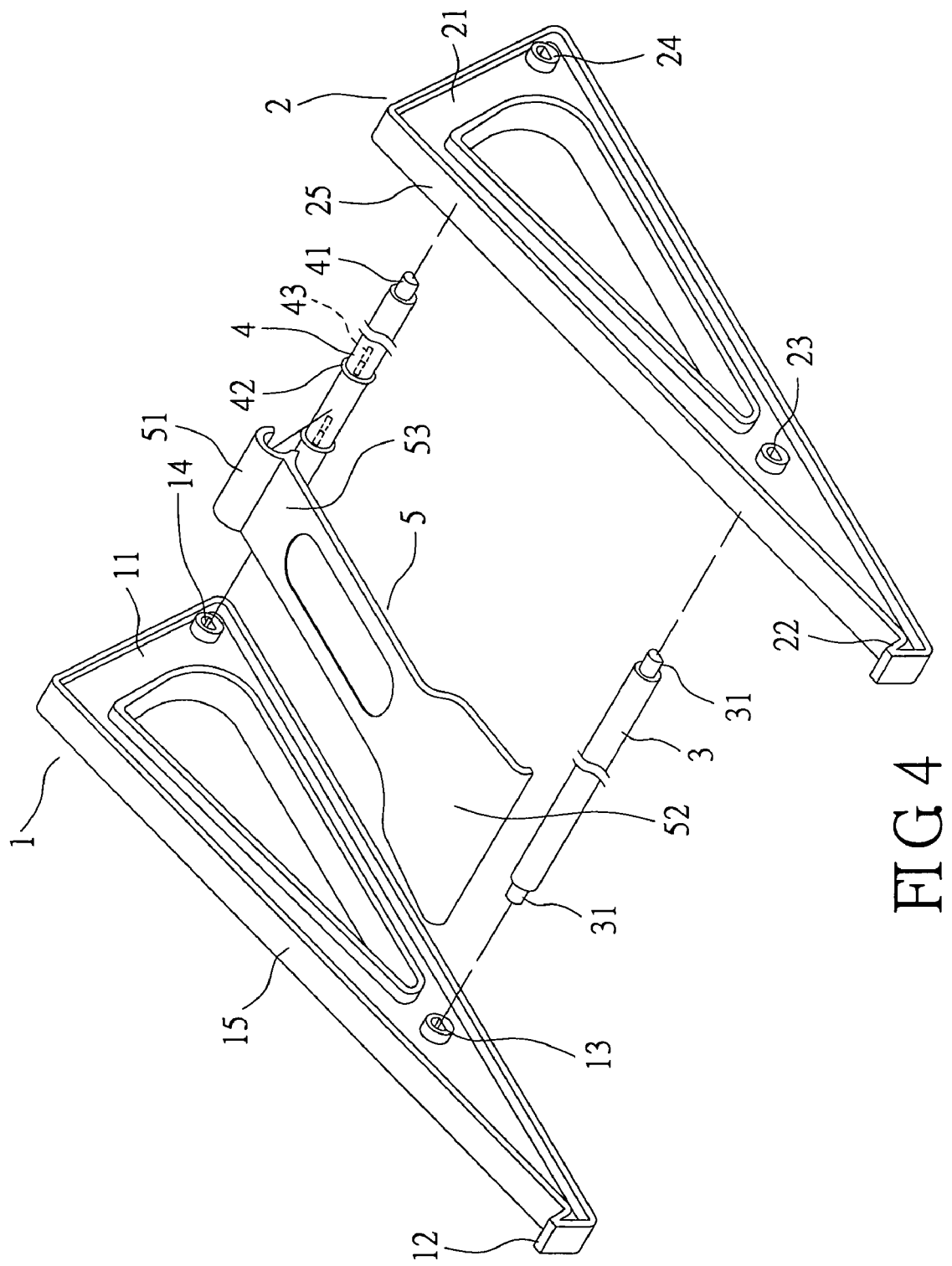
FIG. 4 is an exploded perspective view of the second embodiment of the present invention.
Figure 5:
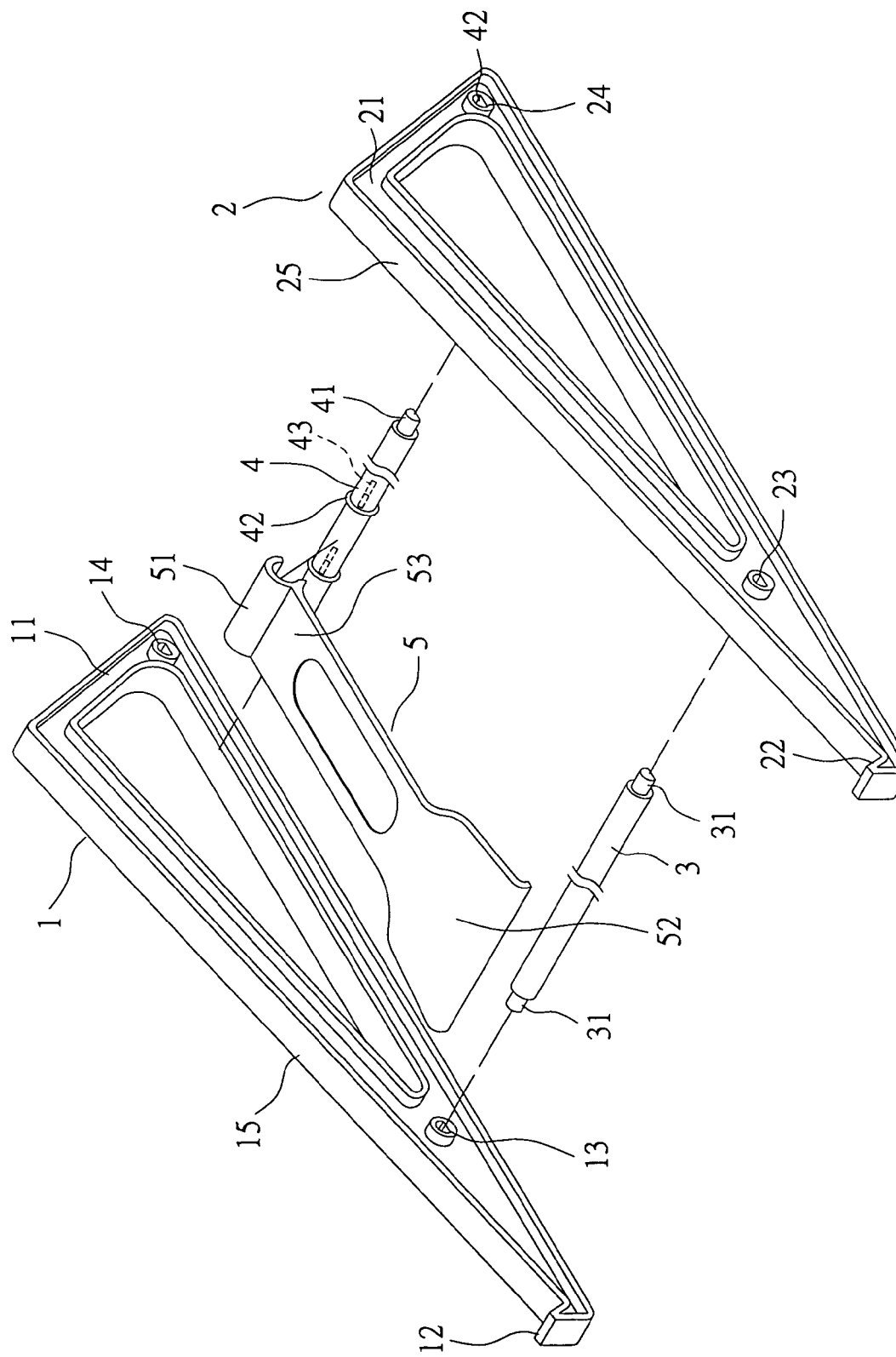
FIG. 5 is an exploded perspective view of the third embodiment of the present invention.
Figure 6:
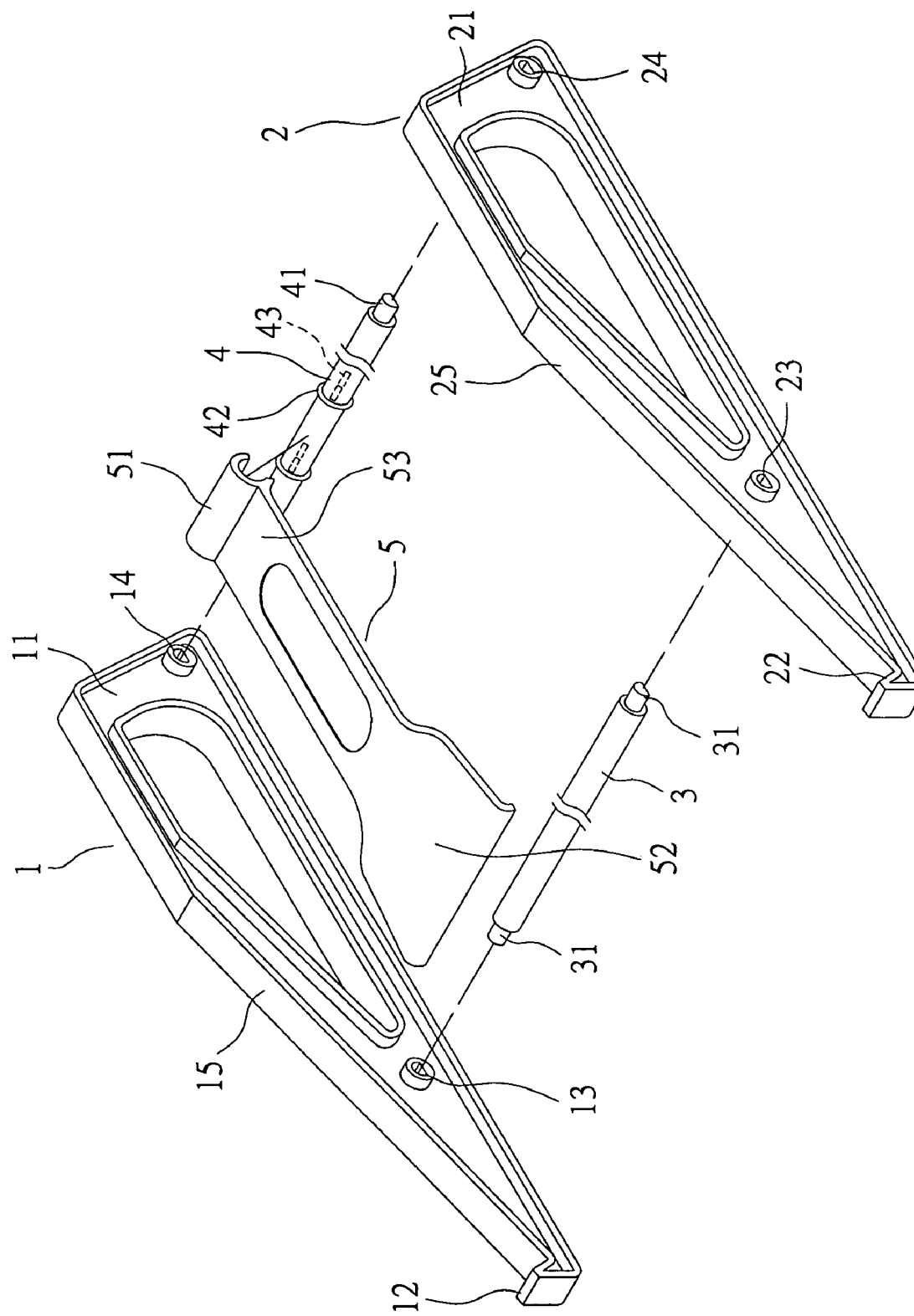
FIG. 6 is an exploded perspective view of the fourth embodiment of the present invention.

Reference is made to FIGS. 4, 5 and 6, which show other embodiments of the present invention. The outline of the bodies 11 and 21 of the first supporting part 1 and the second supporting part 2 is an acute triangle (as shown in FIG. 4), an obtuse triangle (as shown in FIG. 5), or a trapezoid (as shown in FIG. 6). For these three embodiments, the longest sides of the bodies 11 and 21 are used for contacting the table and being a base. The next longest sides of the bodies 11 and 21 are used as the supporting surfaces 15 and 25 for supporting the portable computer. The positioning parts 12 and 22 are located at the top end of the included angle formed by the longest side and the next longest side of the bodies 11 and 21, and are used to prevent the portable computer from dropping. For these three embodiments, the portable computer is supported by the rotating element 5 and the angle of the portable computer is adjusted by rotating the rotating element 5.

The description above only illustrates specific embodiments and examples of the invention. The invention should therefore cover various modifications and variations made to the herein-described structure and operations of the invention, provided they fall within the scope of the invention as defined in the following appended claims.

What is claimed is:

1. A supporting frame, used for supporting a portable computer, comprising:
   two supporting parts located at a distance;
   a front linking rod installed between supporting parts and located at the front end of the supporting parts, and connected with the supporting parts;
   a rear linking rod installed between supporting parts and located at the rear end of the supporting parts, and connected with the supporting parts; and
   a rotating element, wherein one end of the rotating element is rotably wedged and fastened to one of the linking rods, wherein a wedging-fastening part and a pushing-leaning part are individually located at two ends of the rotating element, and the wedging-fastening part is wedged and fastened to the rear linking rod.

2. The supporting frame as claimed in claim 1, wherein the supporting part is a right triangle.

3. The supporting frame as claimed in claim 2, wherein a positioning part is installed at an angle of the supporting part that is not the right angle.

4. The supporting frame as claimed in claim 3, wherein the positioning part is a hook.

5. The supporting frame as claimed in claim 3, wherein a linking hole individually is located at end of the supporting parts having the positioning part and end of the supporting parts having the right angle.

6. The supporting frame as claimed in claim 1, wherein two linking elements are individually located at the two ends of the front linking rod and the rear linking rod.

7. The supporting frame as claimed in claim 6, wherein the linking element is a circular column.

8. The supporting frame as claimed in claim 1, wherein the pushing-leaning part leans against the front linking rod when the pushing-leaning part is not being used.

9. The supporting frame as claimed in claim 1, wherein the shape of the supporting part is an acute triangle, an obtuse triangle, or a trapezoid.

* * * * *